T 5003
March 3, 1959 D. Q. FULLER 2,876,279
WIRED BROADCASTING SYSTEM
Filed May 17, 1954
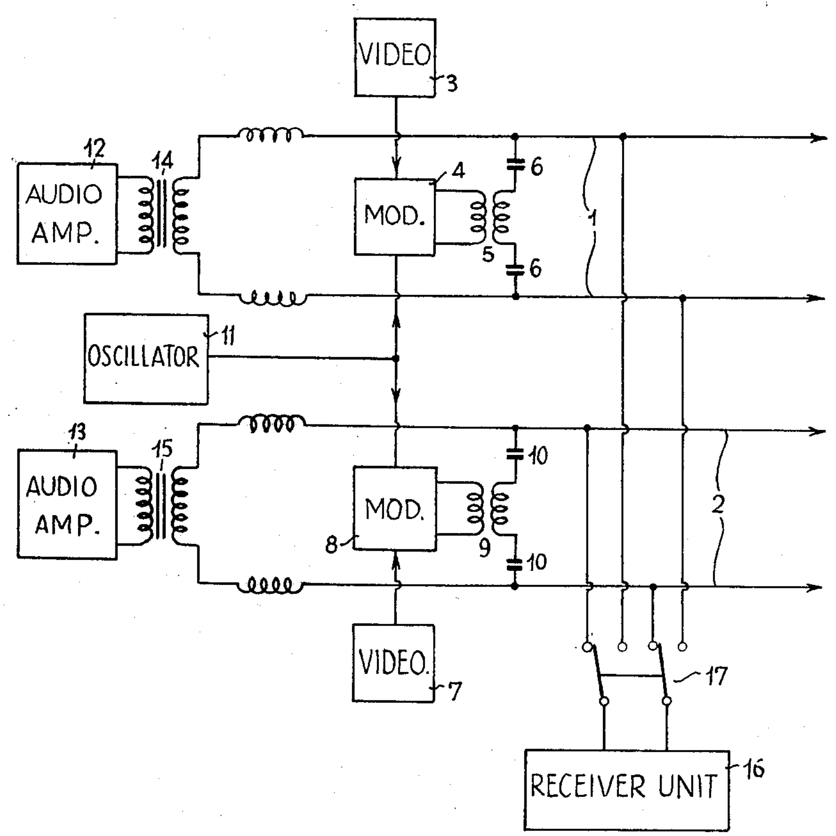
Inventor
DENNIS Q. FULLER
By Holcomb, Wetherill & Brisebois
Attorneys 2,876,279
Patented Mar. 3, 1959

2,876,279

WIRED BROADCASTING SYSTEM

Dennis Q. Fuller, Cambridge, England, assignor to Pye Limited, Cambridge, England, a British company Application May 17, 1954, Serial No. 430,315
Claims priority, application Great Britain May 15, 1953
5 Claims. (Cl. 178—5.6)

The present invention relates to a wired broadcasting system and more particularly to a distribution system for television programmes in which television signals, which may be received from a normal broadcast are distributed over transmission lines from a central station to subscribers' terminal equipments.

The invention has for an object to provide a distribution system in which two or more alternative television programmes can be relayed to the subscribers.

The present invention consists in a system for the distribution of plural television programmes from a central distribution station to one or more remote receiving stations, in which the video signals of the individual television programmes are respectively transmitted as modulated carrier waves over separate pairs of conductors, switching means being provided at a remote station for selectively connecting the receiving equipment thereat to the pairs of conductors in order to select the programmes to be received, wherein the carrier waves transmitted over the different pairs of conductors and on to which the different video signals are modulated have the same frequency and are derived from the same carrier frequency oscillator. The sound signals corresponding to the different television signals may be transmitted over the same pairs of conductors as audio frequency signals.

The arrangement according to the invention enables two or more alternative television programmes and the corresponding sound signals to be distributed over adjacent pairs of conductors, which may be incorporated in a common distribution cable, without introducing interference between the video signals transmitted over the different pairs of conductors since there will be no frequency or phase difference between the carrier waves on which the different video signals are distributed. Furthermore, the distribution of the plural programmes can be effected with the minimum of equipment since only one oscillator is required at the central station for generating the carrier frequency for the different pairs of conductors.

For example, for transmitting two television programmes over a four wire cable, for example a star quad cable, each television programme may be used to modulate one of two identical carrier waves both derived from the same oscillator, the two modulated carriers being transmitted respectively over the two pairs of wires in the cable. The audio signals corresponding to the television signals may be transmitted over the pairs of wires at audio frequency.

The distributed programmes may be separated at the subscriber's station by selectively connecting the pairs of conductors to the receiving unit thereat.

In order that the invention may be more clearly understood, reference will now be made to the accompanying drawing which shows a block diagram of a television relay system according to the invention.

In the drawing, a distribution cable for distributing two television programmes comprises two pairs of wires 1—1 and 2—2. The cable conveniently comprises a star quad cable. The video signals for one programme to be transmitted over the pair of wires 1—1 are fed from a video amplifier 3 to a modulator 4 which is connected across the wires 1—1 by means of a matching transformer 5 and series condensers 6. The video signals for another programme transmitted over the wires 2—2 are fed from a video amplifier 7 to a modulator 8 which is connected across the wires 2—2 by a matching transformer 9 and series condensers 10. According to the invention, the modulators 4 and 8 are both fed from the output of an oscillator 11 producing the carrier frequency for the video signals distributed over both channels, whereby the output signal from the modulators 4 and 8 respectively comprise carrier signals of the same frequency and have no phase difference between them, but respectively bear different video signal modulation.

The sound signals corresponding to each video signal may be transmitted over each pair of wires 1—1, 2—2 in the form of audio frequency signals derived respectively from the audio frequency amplifiers 12 and 13 connected to the lines 1—1 and 2—2 through transformers 14 and 15 respectively.

A subscriber's receiver unit is shown at 16 which is connected to the pairs of wires 1—1 and 2—2 through a changeover switch indicated at 17 whereby either of the television programmes distributed may be selectively connected to the input of the receiver unit.

Whilst a particular embodiment has been described it will be understood that various modifications of the invention may be made without departing from the scope of the invention. For example the oscillator 11 may feed more than two modulators where it is desired to distribute more than two programmes to the subscriber receiver units.

I claim:

1. A system for the distribution of a plurality of different modulated high-frequency signals over separate pairs of conductors to at least one receiving unit, comprising a plurality of pairs of conductors, a separate modulator for each of said pairs of conductors, a modulation waveform generator connected to each modulator, a carrier frequency generator for supplying a single carrier frequency to each of said modulators, at least one receiving unit, and switch means for selectively connecting said at least one receiving unit to each of said pairs of conductors.

2. A system as claimed in claim 1, in which the separate pairs of conductors are all arranged in one cable.

3. A system for the distribution of a plurality of different modulated high-frequency signals over separate pairs of conductors to at least one receiving unit, comprising a plurality of pairs of conductors, a separate modulator for each of said pairs of conductors, a modulation waveform generator connected to each modulator, a separate low-frequency signal generator connected to each of said pairs of conductors, a carrier frequency generator for supplying a single carrier frequency to each of said modulators, at least one receiving unit, and switch means for selectively connecting said at least one receiving unit to each of said pairs of conductors.

4. A system for the distribution of a plurality of different television signals over separate pairs of conductors to at least one receiving unit, comprising a plurality of pairs of conductors, a separate modulator for each of said pairs of conductors, a television video signal generator connected to each modulator, a carrier frequency oscillator for supplying a single carrier frequency to each of said modulators, at least one receiving unit, and switch means for selectively connecting said receiving unit to each of said pairs of conductors.

5. A system for the distribution of a plurality of different television signals over separate pairs of conductors to at least one receiving unit, comprising a plurality of pairs of conductors, a separate modulator for each of said pairs of conductors, a television video signal generator connected to each modulator, a separate audio-frequency signal generator connected to each of said pairs of conductors, a carrier frequency oscillator for supplying a single carrier frequency to each of said modulators, at least one receiving unit, and switch means for selectively connecting said receiving unit to each of said pairs of conductors.

References Cited in the file of this patent

UNITED STATES PATENTS

| | | |
|---|---|---|
| 2,135,577 | Herbst | Nov. 8, 1938 |
| 2,523,173 | Winters | Sept. 19, 1950 |
| 2,570,475 | Oestreicher | Oct. 9, 1951 |
| 2,571,137 | Hotine | Oct. 16, 1951 |